United States Patent [19]
Youngman

[11] 3,747,844
[45] July 24, 1973

[54] COMPUTING APPARATUS

[76] Inventor: Phillip Robert Vassar Youngman, c/o Faculty of Technology, Open University, Milton Keynes, Bucks, England

[22] Filed: Nov. 11, 1971

[21] Appl. No.: 197,841

[30] Foreign Application Priority Data
Nov. 11, 1970 Great Britain.................... 53,755/70

[52] U.S. Cl.............................. 235/68, 235/61 A
[51] Int. Cl............................................. G06c 1/00
[58] Field of Search ................ 235/61 A, 68; 35/30, 35/32, 31 R, 31 C

[56] References Cited
UNITED STATES PATENTS

| | | | |
|---|---|---|---|
| 3,006,082 | 10/1961 | Libbey.................................... | 35/30 |
| 3,116,014 | 12/1963 | Aymar.............................. | 235/61 A |
| 3,273,794 | 9/1966 | Lieberman et al................ | 235/61 A |
| 3,314,169 | 4/1967 | Wold..................................... | 35/32 |
| 3,331,143 | 7/1967 | Weisbecker............................ | 35/30 |
| 3,388,483 | 6/1968 | Weisbecker............................ | 35/30 |
| 3,390,471 | 7/1968 | Godfrey............................ | 235/68 X |
| 3,403,459 | 10/1968 | Divilbiss............................ | 235/68 X |

Primary Examiner—Richard B. Wilkinson
Assistant Examiner—U. Weldon
Attorney—Irvin S. Thompson et al.

[57] ABSTRACT

A mechanical digital computing apparatus has three banks of bistable devices, each device being movable between "0" and "1" positions manually and by the passage thereby of balls on a guide track. A number set up on one of the stores of bistable devices is operated on by a number set up on another store by the passage of balls along the guide track in a manner selected by function selection devices which influence the directions taken by the balls. The result appears on the third bank of bistable devices.

16 Claims, 3 Drawing Figures

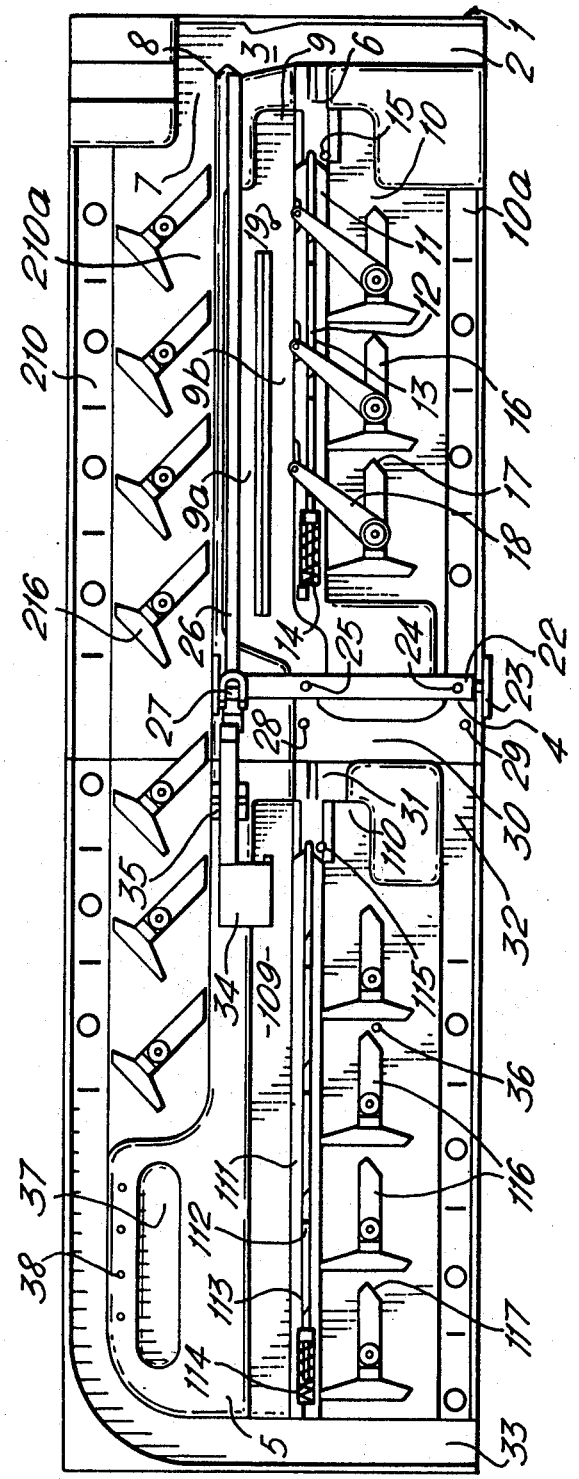

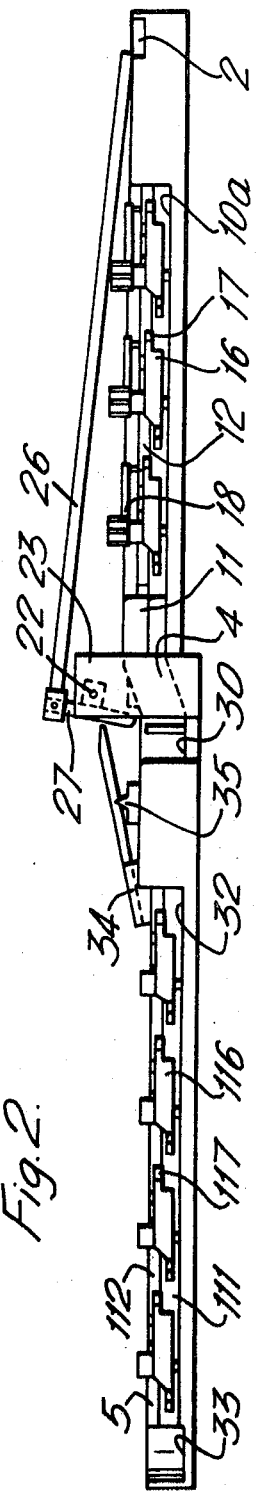
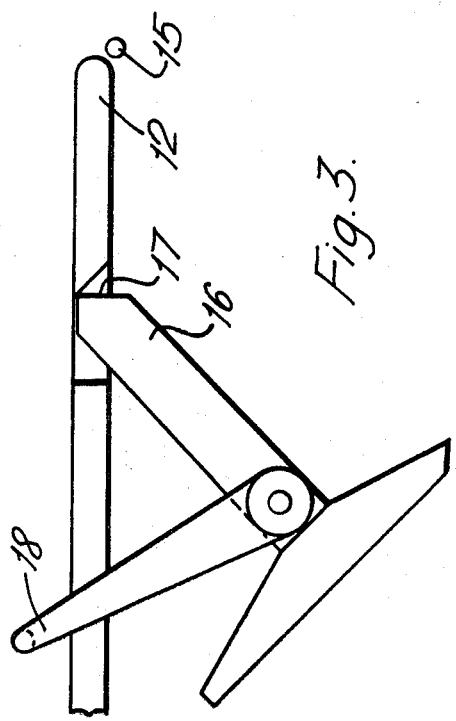

COMPUTING APPARATUS

The invention relates to computing apparatus and in particular to mechanically operated digital computing apparatus, intended primarily for educational purposes.

According to the invention there is provided a mechanical digital computer apparatus comprising a guide means for movable elements, a plurality of indicating devices located for co-operation with elements movable on the guide means, each device being changeable from a first condition to a second condition by the passage thereby of an element. The computing apparatus can be arranged to perform mathematical operations under power derived from the movement under gravity of successive balls to engage with the devices which are preferably bistable and with function selection devices, the path which each ball follows being determined by the conditions of the bistable devices and the function selection devices which it encounters. Three sets or number stores of the mechanical bistable devices, or flip flops, can be provided, the first and second being operable manually to set up two numbers which are to operate one upon the other, the third set being used to display the answer.

A preferred embodiment of the invention will now be described with reference to the accompanying drawings in which:

FIG. 1 shows a plan view of a computer apparatus according to the invention;

FIG. 2 shows a side view of the computer apparatus of FIG. 1;

FIG. 3 shows an enlarged view of one part of the computer apparatus of FIG. 1.

With reference to the drawings, the computer apparatus shown comprises a generally flat elongated base board 1 which has an inclined transverse step 4, and which is arranged to rest on a horizontal surface with the right hand end, as shown, higher than the left hand end. The board is divided longitudinally by a ridge 5.

The upper surface of the basic board is formed so as to provide guide means for movable elements constituted by balls of metal or other suitable material. The guide means for the balls comprises a transverse inlet channel 2 which communicates with a first longitudinal channel 6 and then with a store 3 for the balls. The store 3 leads to a second longitudinal channel 7 on the other side of the ridge 5 from the channel 6. A bar 8 extends beyond one end of the ridge 5, to prevent balls accumulated in the store 3 from prematurely escaping into the channel 7.

The channel 6 divides into two separate channels 9 and 10, which are separated by a ridge 11. The channel 6 is slightly higher than the channels 9 and 10 to assist rolling of the balls. A slidable bar 12 is mounted in a slot 13 in the ridge 11. The bar 12 is biassed by a spring 14 towards the channel 6 and a pin 15 is mounted on the board 1 at the division of the channel 6 into the channels 9 and 10. The channel 10 has a deeper channel portion 10a at the front edge of the board (as shown in FIG. 1) which channel runs parallel with the channel 10. Three flip-flops 16, each in the form of a generally T-shaped horizontal lever, are mounted on pins so that they may pivot about a vertical axis between a first position, as shown in FIG. 1, where one arm of the "T" is in engagement with the ridge 11, and a second position as shown in FIG. 3 where the leg of the "T" engages the bar 12. Each flip-flop 16 has a surface 17 on the leg of the "T" which may engage an indentation in the bar 12 and hence inhibit motion of the bar in a direction away from the pin 15. An arm 18 with a depending portion is mounted on the pin of each flip-flop 16 for joint rotation with the associated flip-flop 16, the arm 18 however being adjustable angularly by turning a knob relative to the flip-flop 16. An indicator mark may be mounted on one arm of the flip-flop 16, to indicate the first and second positions which (as shown) are designated "0" and "1."

When setting a desired number on each of the flip-flops 16, the arm 18 is turned fully in the direction of motion of the flip-flop 16. In this way, when the flip-flop is in the "0" position as shown, the arm 18 engages the ridge 11 on the right of the pivot pin as shown, and when the flip-flop is in the "1" position the arm engages the ridge 11 on the left of the pivot pin. It can be seen that when a flip-flop so set, is moved to the other position, the arm 18 will extend into the channel 9 to be impinged by a ball in the channel.

The channel 9 is divided over the middle part of its length into two separate channels 9a and 9b. The channel 9b is arranged to be close to the arms 18 of the flip-flops so that a ball passing down the channel 9b can impinge on the arm when they are in the extended position. The channel 9a is remote from the arms 18. A hole 19 is provided at the entrance of the channel 9b to receive when required a pin to divert balls which would normally travel down channel 9b into channel 9a.

A rocker bar 22 is pivotally mounted on side members 23 so that it is held above the channels 9 and 10 and has holes 24 and 25 therethrough which may receive pins, the pins passing through the holes and depending from the bar towards the channels 9 and 10.

A rod 26 is pivotally mounted on a bar 27 which is co-rotatably mounted in the rocker bar 22. The rod 26 extends along the ridge 5, so that rotation of the bar 22 in a clockwise direction (FIG. 2) causes the bar 27 to move the rod 26 so that it extends beyond the end of the ridge 5. Resilient or other means (not shown) tends to maintain the rocker bar 22 in a position in which the rod 26 is in the non-extended position. The bar 27 also depends from the bar 22 towards the ridge 5. Pin receiving holes 28 and 29 are positioned at the ends of the channels 9 and 10 respectively in a passageway 30 which joins the channels 9 and 10.

Two further channels 31 and 32 lead from the passageway 30, the channel 32 leading straight to an outlet channel 33, and the channel 31 dividing into two channels 109 and 110 which are similar to the channels 9 and 10 except that the channel 109 does not subdivide into two channels. The channel 32 forms a deeper portion of the channel 110 which is similar to the channel 10a. The channel 109 which leads to the outlet 33 and is separated from the channel 110 by a ridge 111. A slidable bar 112 is mounted in a slot 113 on the ridge 111 and is biassed by a spring 114 towards the channel 31. A pin 115 is situated at the end of the bar 112 in a similar manner to the pin 15 at the end of the bar 12 in the channel. Four bistable flip-flops 116 which are similar to the flip-flops 16 are mounted in the channel 110, and have similar first and second positions designated by "0" and "1." Each flip-flop 16 has a surface 117 for engaging a groove in the bar 112 to inhibit the motion of the bar 112. A pin receiving hole 36 is provided between the first two slip-flop 116.

An inhibit bar 34 of generally L-shape is mounted on a pivot 35 and one end of the bar 34 extends into the channel 109, the other end being engageable with the bar 27 when the inhibit bar 34 is pivoted out of the channel 109, so that, when engaged with the inhibit bar 34, the bar 27 prevents rotation of the rocker bar 22 and hence motion of the rod 26. The inhibit bar acts as a switch to stop the calculation when it is completed and can indicate to an operator when the calculation is completed.

The channel 7 at the other side of the ridge 5 leads into a further channel 210 which is similar to the channel 10 in having a deeper portion 210a leading to the outlet 33 and having mounted therein seven flip-flops 216 similar to the flip-flops 16.

The flip-flops 216 also have similar first and second positions designated by "0" and "1" as shown but the positions "0" and "1" are reversed relative to the positions "0" and "1" of the flip-flops 16 and 116.

There is provided a store 37 for balls and a plurality of holes 38 for storing pins when they are not in use. In an alternative form of the invention, the bars 12 and 112 and the slits 13 and 113 in the ridges 11 and 111 are replaced by bars of generally L-shaped section which are mounted on the ridges 11 and 111, one leg of the L-shape being flat on the ridge and having elongate slits receiving pins mounted in the ridges so that the bar is slidable on the ridge. In order to provide function selection, instead of being subdivided, the channel 9 is unitary and a detent is provided on the bar on the ridge 11 so that when in operation the detent inhibits motion of the bar towards the pin 15. A suitable detent is a lever pivotally mounted so that it can be held by a pin out of engagement with the bar, or when not held by the pin is pivoted into engagement by gravity.

In order to explain the operation of the device, the procedure to carry out each of the functions of addition, substraction, multiplication and division will be explained in detail hereinafter.

In order to carry out the operation of addition of two numbers, one of the two numbers to be added is set up on the bank of flip-flops 16 and the other on the bank of flip-flops 116. The numbers are set up in binary code, by turning each flip-flop 16 or 116 to designate the number "1" or "0" as required. Each arm 18 on each flip-flop 16 is turned fully in the direction in which the flip-flop 16 is moved so that the depending portion of the arm 18 abuts a recess provided in the ridge 11. In order to select the required function, pins are set only in the pin receiving holes 24, 25, 36 and 19, and the surfaces 17 and 117 ofthe flip-flops 16 and 116 are engaged with the slidable bars 12 and 112 respectively. The flip-flops 216 are all set in the first position to designate "0." The bar 34 is positioned so that it extends into the channel 109.

One by one, ball bearings from any suitably arranged source are introduced into the inlet passageway 2 which is so shaped that the balls roll towards and collect against the bar 8. The store 3 is large enough for only two balls so that a third ball rolls down the channel 6 and impinges upon the end of the slidable bar 12, which is held against recoiling motion by the surfaces 17 of any flip-flops 16 which are in the second position designating a "1." If the number on the set of flip-flops 16 is non-zero the ball is deflected by the bar 12, since it extends beyond the pin 15, in to the channel 10 whereupon the ball engages the first flip-flop 16, knocking it into the opposite state from the state into which it was set.

If the first flip-flop 16 is set at the "0" position, the ball rolls onto the surface of the leg of the T-shape adjacent the ridge 11 and impinges the arm of the T-shape adjacent the ridge 11 so pivoting it around the pivot pin, and hence into the "1" position. The ball then impinges on the second flip-flop 16 and acts on this in a way similar to the first flip-flop 16.

If the state of the first flip-flop 16 is set at the "1" position, the ball impinges on the surface of the leg and thence onto the lower arm of the T-shape, thereby pivoting the flip-flop 16 into the "0" position, whereupon the ball rolls straight into the deeper portion 10a of the channel 10 and does not impinge on any of the other flip-flops 16.

Thus it can be seen that every ball that rolls down the channel 10 decreases the number stored on the flip-flops 16 by one. For example, if the number set on the set of three flip flops 16 is 111 in binary code or 7 in decimal code, the ball will change the first flip-flop 16 to the "0" position and as explained above will not impinge on the other flip-flops of the set. Thus the number remaining will be 110 or 6 in decimals. A second ball will change the first flip-flop back to the "1" position and will alter the second flip-flops to the "0" position and not impinge on the third flip-flop. Thus the number remaining will be 101 or 5 in decimals. Similarly every ball that rolls down channel 110 decreases the number stored on the flip-flops 116 by one. In a similar manner, but because the positions "0" and "1" are reversed, every ball that rolls down the channel 210 increases the number stored on the flip flops 216 by one. Thus flip-flops 216 count the number of balls introduced into the channel 7.

The above mentioned ball, which has been introduced into inlet 2, rolls down the channel 10 thereby decreasing the number stored on the flip-flops 16 by one, and impinges on the pin which depends from the pin-receiving hole 24 in the rocker bar 22.

The momentum of the ball causes the pin and the rocker bar 22 to be pivoted about the axis of the rocker bar 22 which moves the rod 26, causing it to extend beyond the end of the ridge 5 and push a stored ball around the bar 8, whereupon the stored ball rolls down the channel 210 to be counted by flip-flops 216. The first ball continues along channel 32 unimpeded to the outlet 33.

Thus each ball that rolls down channel 10 causes the number stored on the flip-flops 16 to be decreased by one until the number reaches zero. The number of balls which have rolled down channel 10 in this manner is equivalent to the number of balls introduced into channel 210, which number has been counted by flip-flops 216.

Thus, all the flip-flops 16 are in the first position, i.e. reading "0." The slidable bar 12 is now free to move since the surfaces 17 no longer impede it, whereupon when the next ball impinging on the bar 12 will cause it to recoil under the impact and allow the ball to impinge on the pin 15 thereby causing the ball to roll into channel 9 where it will meet the pin in the hole 19. The ball will impinge on the pin and be directed into the channel 9 to avoid the arms 18 of the flip-flops 16. In the alternative form, in which the channel 9 is not divided, the ball will impinge on the arms 18 of those flip-flops 16 which originally were set to the second position to read "1," pushing those flip-flops 16 into the second position again. However the surfaces 17 of these flip-flops 16 are unable to engage the alternative form of bar, since the function selector as explained before holds the bar against its bias and prevents it moving to its normal position. In this way, the bar is not prevented from recoiling under the impact of subsequent balls. Thus the ball continues and impinges on the pin in the pin-receiving hole 25, thereby pivoting the bar 22 and, moving the bar 26 and causing another stored ball to be counted in channel 210.

The ball continues down channel 31 and impinges on the bar 112 which is held against free motion by the surfaces 117 of those flip-flops 116 which are set in the "1" position thus causing the ball to roll down channel 110 and decrease the number stored on the flip-flops 116 by one.

Thus the number stored on the flip-flops 116 will be decreased until the first flip-flop 116 only is in the second position storing a "1." The pin in hole 36 is positioned to prevent the surface 117 of the first flip-flop 116 engaging the bar 112, whereon the ball which would reduce the number to zero is directed by the recoil of the bar 112 and the pin 115 instead into the channel 109 whereupon it impinges on the inhibit bar 34 causing it to pivot and to indicate to an operator ocmpletion of the operation and to engage the bar 27 which then prevents further action of the counting mechanism in the event of inadvertent admission of further balls. Thus any further balls introduced will not be counted, and will remain held in the channel 9.

To carry out the operation of subtraction, the larger number is stored on flip-flops 116 and the smaller number on flip-flops 16. The operation is basically the same as for addition, however the pin in the hole 24 is taken away and a pin is placed in the hole 29. Now the balls rolling down channel 10, thereby decreasing the number stored on flip-flops 16, are not counted by the counting mechanism, since they do not cause rotation of the bar 22. The balls are deflected from their path to roll down channel 31 instead of channel 32 by the pin in the hole 29 and hence they roll down channel 110 to decrease the number stored on flip flops 116. Thus the number stored on flip-flops 16 is subtracted, by the introduced balls, from the number stored on flip-flops 116, the resultant then being counted by the flip-flops 216 by balls which are directed by the bar 12 and the pin 15, as explained before, down channel 9 and 9a, each of which pivots the bar 22, until the inhibit bar 34 is activated, as explained before, thereby stopping the counting mechanism.

To carry out the operation of multiplication, pins are placed only in the holes 24 and 36. As there is no pin in the hole 19, the balls introduced into the channel 9 will pass down channel 9b and engage the arms 18 of the flip-flops 16. In the alternative embodiment, a pin is placed in the hole in the function selector acting to bias the function selector out of engagement with the bar and allow movement of the bar under the spring bias.

The introduced balls, as before, roll down channel 10, thereby decreasing the number stored on the flip-flops 16 and at the same time being counted by the flip-flops 216 since each ball impinges the pin in the hole 24, finally passing down channel 32 to the outlet. When the number set on the flip-flops 16 reaches zero, i.e. all the flip-flops 16 are in the first position, the next introduced ball is caused as before to roll down the channel 9 and thence the channel 9b, thereby impinging on the arms 18 of those flip-flops 16 which were originally set at "1," thereby re-setting those flip-flops again at "1." The arms 18 of those flip-flops which were originally set at "O" are not moved by the ball since they do not extend into the channel in the "O" position. Thus the original number is reset, and the surfaces 17 re-engage the bar 12. The resetting ball is not counted since there is no pin in the hole 25 and passes through the area 30 into the channel 110 thereby decreasing the number stored on the flip-flops 116 by one. Thus the apparatus has counted on the flip-flops 216 the number stored on the flip-flops 16 once. The cycle is continued until the number stored on the flip-flops 16 has been counted the number of times of the number on the flip-flops 116 and only the first flip-flop 116 is in the second position, whereupon the next ball to travel down channel 9 passes down channel 109, owing to the pin in the hole 36 preventing inhibiting of the bar 112 and, as before, causes the inhibit bar 34 to inhibit the counting mechanism hence completing the operation. Thus the operation counts the number stored on flip-flops 16 the number of times of the number stored on the flip-flops 116.

To carry out the operation of division, pins are placed only in the holes 25, 28 and 29, and in the alternative form, the function selector is biassed away from the bar. The larger number is placed on the flip-flops 116, and the smaller on the flip-flops 16 as described before. As before, balls are introduced and roll eventually down channel 10, thereby decreasing the number stored on the flip-flops 16 by one. The balls in channel 10 are not counted; but impinge the pin the hole 29 thereby being deflected into the channel 31 instead of the channel 32, wherefrom they continue down channel 110 impinging the flip-flops 116 as before. Thus the operation continues until the number stored on the flip-flops 16 is decreased to zero and subtracted from the number stored on the flip-flops 116, whereupon, as before, the next ball is directed down the channel 9 resetting the flip-flops 16 and being counted by the pin in the hole 25, finally deflecting off the pin in the hole 28 down channel 32 to the outlet. The cycle is then repeated, subtracting the smaller number from the remaining number on the flip-flops 116 and counting a ball everytime the subtraction is completely successfully, until the flip-flops 116 are all in the first position, whereupon a further ball will operate the inhibit bar 34 and halt the process.

It will be evident that the apparatus particularly described can be modified in a variety of ways without departing from the scope of the invention. Thus for example the operation of the flip-flops 216 can be effected by the release of balls from a separate store from those which act on the flip-flops 16 and 116, or the movements of the rod 26, each of which corresponds to a count of one in the flip-flops 216, can be used to effect display of the computed total by a different form of counter mechanism.

I claim:

1. A mechanical digital computer apparatus, comprising guide means for guiding movable elements therealong, said guide means having a first portion communicating with both a first and a second route, a plurality of indicating devices each having a first condition and a second condition, means mounting said indicating devices such that each is changeable from the first condition to the second condition by the passage thereby of an element on said first route and such that an element passing along said second route avoids all the devices, and selecting means for directing an element on said first portion on to one or other of said first and second routes, said selecting means being responsive to the condition of said devices whereby said selecting means is actuated by all said devices being out of said second condition to direct an element moving along said first portion onto said second route.

2. An apparatus as claimed in claim 1, including a third route communicating with said second route, each device having means arranged so that the means can project into the path of elements moving along the third route whereby an element moving therealong resets each device into an individually preselected one of said conditions.

3. An apparatus as claimed in claim 1, in which the selecting means comprises a recoil bar movable in the direction of motion of elements on said first portion, the bar being engageable by each device when the device is said second condition to prevent recoil motion of said bar, and a pin, whereby, when at least one of said devices is in said engagement with said bar, an element moving on said first portion is deflected by said recoil bar onto said first route and when all said devices are out of said engagement, an element moving on said first portion causes said bar to recoil and the element is deflected by said pin onto said second route.

4. A mechanical digital computer apparatus, comprising guide means for guiding movable elements therealong, said guide means having a first portion communicating with both a first and a second route, a plurality of indicating devices each having a first condition and a second condition and including a member movable with the device but adjustable relative thereto, means mounting said indicating devices such that each can be set into an individually preselected one of said conditions, such that each is changeable from the first condition to the second condition by the passage thereby of an element on said first route and such that the member of each can project into the path of elements moving on said second route, and selecting means for directing an element on said first portion onto one or other of said first and second routes whereby an element directed to said second route engages those members projecting into the path of elements on said second route to reset the devices associated with said those members into said selected one of said conditions.

5. An apparatus as claimed in claim 4, in which there is provided a third route communicating with said second route arranged such that an element moving therealong avoids all said members of said devices.

6. An apparatus as claimed in claim 5, including a hole for receiving a pin for deflecting an element moving along said second route onto said third route.

7. A mechanical digital computer apparatus, comprising, a first, a second and a third set of bistable devices, means mounting each of said devices such that each is changeable between a first condition indicating "0" and a second condition indicating "1" by the passage thereby of a movable element, guide means for guiding movable elements therealong including a first portion communicating with a first route upon which an element will effect a change of condition of at least one of the first set of devices and with a second route upn which an element will avoid all the devices of the first set, selecting means for directing an element moving on said first portion onto one or other of said first and second routes, the selecting means being responsive to the condition of the devices of the first set whereby said selecting means is actuated by all the devices of the first set being out of said second condition to direct the said element moving on said first portion onto said second route, and means arranged so that at least some of the elements guided to the first and second sets effect a change of the condition of at least one of the devices of the third set to cause the third set to indicate a binary value which is the function of binary values originally indicated by the first and second sets.

8. An apparatus as claimed in claim 7, including a third route communicating with said second route, each device having means arranged so that the means can project into the path of elements moving along the third route whereby, after the passage of an element therealong each device is reset into an individually preselected one of said conditions.

9. An apparatus as claimed in claim 7, in which said guide means includes a second portion communicating with said first and second routes and with a fourth route upon which an element will effect a change of condition of at leaast one of the devices of the second set and with a fifth route upon which an element will avoid all the devices of the second set.

10. A mechanical digital computer apparatus as claimed in claim 8, including selecting means for directing an element moving on said second portion onto one or other of said fourth and fifth routes, the selecting means being responsive to the condition of the devices of the second set whereby said selecting means is actuated by all said devices of said second set being out of said second condition to direct the said element moving on said second portion onto said fifth route.

11. An apparatus as claimed in claim 7, in which the selecting means comprises a recoil bar movable in the direction of motion of elements on said first portion, the bar being engageable by each device of the first set when the device is in said second condition to prevent recoil motion of said bar, and a pin, whereby, when at least one of the devices of said first set is in said engagement with the bar, an element moving on said first portion is deflected by said recoil bar onto said first route, and when all the devices of said first set are out of said engagement an element moving on said first portion causes said bar to recoil and the element is deflected by said pin onto said second route.

12. A mechanical digital computer comprising a first and a second set of bistable devices, each device being changeable between a first condition indicating "0" and a second condition indicating "1" by the passage thereby of a movable element, guide means for guiding the movable elements therealong, the guide means comprising a first portion communicating both with a first route upon which a movable element will effect a change in the condition of at least one of the devices of the first set and with a second route, selecting means adapted to direct an element from the first portion of said guide means onto one or other of said routes in dependence on the condition of the devices of the first set, and means for counting elements directed to at least one of said first and second routes.

13. A mechanical digital computer as claimed in claim 12, including means for ejecting a movable element from a reservoir in response to the passage of an element along said at least one of said first and second routes.

14. A mechanical digital computer as claimed in claim 13, wherein said ejecting means comprises a rocker bar having at least one hole for receiving a pin, means mounting said rocker bar so as to be pivotable about an axis along its length and so that the pin extends into the path of an element on said at least one of said first and second routes, and a rod pivotally journalled to the rocker bar and extending to said reservoir, whereby an element impinging on said at least one pin causes pivotal movement of the rocker bar and linear movement of the rod to eject an element from said reservoir.

15. A mechanical digital computer as claimed in claim 12, in which said counting means includes a third set of bistable devices, each device being changeable between a first condition indicating "0" and a second condition indicating "1" by the passage thereby of an element, said third set of devices being arranged so that each element directed thereto increases the binary value indicated by said set by 1.

16. A mechanical digital computer apparatus as claimed in claim 12, in which said guide means includes a second portion communicating with said first and second routes and both with a third route upon which an element will effect a change in the condition of at least one of the devices of said second set and a fourth route, selecting means to direct an element from the second portion onto one or other of said third and fourth routes in dependence upon the condition of the devices of the second set, and switch means dependent upon the passage of an element along said fourth route to indicate the completion of a calculation and to stop the actuation of said counting means.

* * * * *